US010038508B1

(12) United States Patent
Kerselaers et al.

(10) Patent No.: US 10,038,508 B1
(45) Date of Patent: Jul. 31, 2018

(54) WIRELESS COMMUNICATION UNIT DIAGNOSTICS

(71) Applicant: NXP B.V., Eindhoven (NL)

(72) Inventors: Anthony Kerselaers, Herselt (BE); Liesbeth Gomme, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/785,662

(22) Filed: Oct. 17, 2017

(51) Int. Cl.
*H04B 17/23* (2015.01)
*H04B 3/46* (2015.01)
*H04B 17/12* (2015.01)
*H04B 17/14* (2015.01)

(52) U.S. Cl.
CPC ............ *H04B 17/23* (2015.01); *H04B 3/46* (2013.01); *H04B 17/12* (2015.01); *H04B 17/14* (2015.01)

(58) Field of Classification Search
CPC .......... H04B 17/23; H04B 17/14; H04B 3/46; H04B 17/12
See application file for complete search history.

(56) References Cited

U.S. PATENT DOCUMENTS

| | | | | |
|---|---|---|---|---|
| 6,346,910 | B1 * | 2/2002 | Ito | H01Q 3/2611 342/174 |
| 6,356,207 | B1 * | 3/2002 | Oouchi | H04B 17/15 235/384 |
| 8,422,540 | B1 * | 4/2013 | Negus | H04B 1/38 370/210 |
| 9,191,903 | B2 | 11/2015 | Sasson | |
| 9,628,203 | B2 * | 4/2017 | Weissman | H04B 17/13 |
| 2004/0106380 | A1 * | 6/2004 | Vassiliou | H04B 17/14 455/73 |
| 2004/0203472 | A1 * | 10/2004 | Chien | H04B 1/30 455/68 |
| 2004/0204105 | A1 * | 10/2004 | Liang | H04B 7/0608 455/562.1 |
| 2006/0035601 | A1 * | 2/2006 | Seo | H04B 1/40 455/78 |
| 2007/0190952 | A1 * | 8/2007 | Waheed | H04B 1/0475 455/114.3 |
| 2013/0122956 | A1 * | 5/2013 | Lee | H04W 52/04 455/522 |
| 2013/0217343 | A1 * | 8/2013 | Tenbroek | H04W 24/00 455/77 |

(Continued)

FOREIGN PATENT DOCUMENTS

EP 2983298 A2 10/2016

*Primary Examiner* — Kenneth Lam (57) ABSTRACT

Embodiments of a wireless communication unit and operation of such unit in a test mode are provided, where a wireless communication unit includes: transmit and receive path circuitry coupled to an antenna via a switch; which is operated to: close the switch to connect the transmit path circuitry to the antenna, wherein the receive path circuitry remains unconnected, activate the transmit path circuitry to transmit an RF test signal on the antenna, wherein the RF test signal couples across the switch as a leakage signal, activate the receive path circuitry concurrently as the RF test signal is transmitted, wherein the receive path circuitry provides the leakage signal to an RF to DC converter via a directional coupler, and wherein the RF to DC converter is configured to generate an error signal that indicates whether an error has been detected in the receive path circuitry.

20 Claims, 6 Drawing Sheets

(56) References Cited

U.S. PATENT DOCUMENTS

2015/0028946 A1\* 1/2015 Al-Qaq ................. H03F 1/3241
  330/149
2018/0131453 A1\* 5/2018 Sharma .................. H04B 17/14

\* cited by examiner

FIG. 7

WIRELESS COMMUNICATION UNIT DIAGNOSTICS

BACKGROUND

Field

This disclosure relates generally to wireless communication systems, and more specifically, to a diagnostic approach for testing receive path circuitry of a wireless communication unit.

Related Art

Vehicles are often equipped with electronic control systems to assist drivers in controlling the vehicle. Such systems may include radio frequency (RF) communication systems that communicate with other vehicles or road side units in the surrounding environment of the vehicle. It is important that RF communication systems are able to detect and address various failure mechanisms, such as transient faults or component failures, during runtime operation of the RF communication system, where such failures can be especially disastrous in an automotive environment.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.
Overview The electronic control systems implemented in a vehicle must meet stringent automotive safety standards to ensure driver safety. These standards include functional safety standards that require an electronic control system to continue to operate correctly even under failure mode conditions. For example, faults are required to be detected during functional operation of the electronic control system, such as in a radio frequency (RF) communication system. Transient faults may occur due to exposure of the RF communication system to cosmic rays, which may change the contents of registers that control an RF transceiver of the RF communication system (e.g., flipping the bit stored in a flip-flop, which changes a transmitter or receiver gain setting), or may directly impact the RF block by disturbing its internal signals. Other faults may also occur, such as the failure of a component in the transceiver. Since wireless communication implemented in a vehicle requires a larger coverage area that spans hundreds of meters (e.g., to ensure overlapping coverage areas with other vehicles in a range of up to 1 km while the vehicle is traveling at high speed), RF amplifiers are often implemented to boost signal power in wireless communication transceivers. For example, a power amplifier (PA) is often implemented in a transmitter and a low noise amplifier (LNA) is implemented in a receiver (where a transceiver implements both a transmitter and a receiver).

The LNA is more vulnerable to electrostatic discharge (ESD), such as due to lightning, than the PA and may fail when exposed to such conditions. Proper operation of the LNA is difficult to check since the LNA is on the receiver side of the transceiver, which usually does not have the means for directly providing a test signal at the input of the LNA due to added complexity and cost (e.g., adding a signal generator on the receiver side of the transceiver). This problem is also exacerbated if the testing means can only access the wireless communication unit by a single coaxial cable, which cannot separate a transmitted test signal to the LNA and receive a test result signal at the same time.

The present disclosure provides a diagnostic approach for detecting the functionality of a low noise amplifier (LNA) in a wireless communication device by transmitting a radio frequency (RF) test signal and concurrently measuring the signal power of the output of the LNA as it amplifies a leakage signal coupled from the RF test signal. The signal power of the LNA output is converted into an analog voltage (also referred to as a direct current (DC) voltage) by an RF to DC converter. An error is detected at the LNA when the signal power falls below an expected signal power. In some embodiments, the analog voltage or a digital code that corresponds to the analog voltage is provided to a base unit, where the LNA is implemented in a remote unit, and the remote unit is coupled to the base unit by a single cable (e.g., a coaxial cable). In such embodiments, the base unit also provides the RF test signal to the remote unit via the cable.

Example Embodiments

Figure 1:
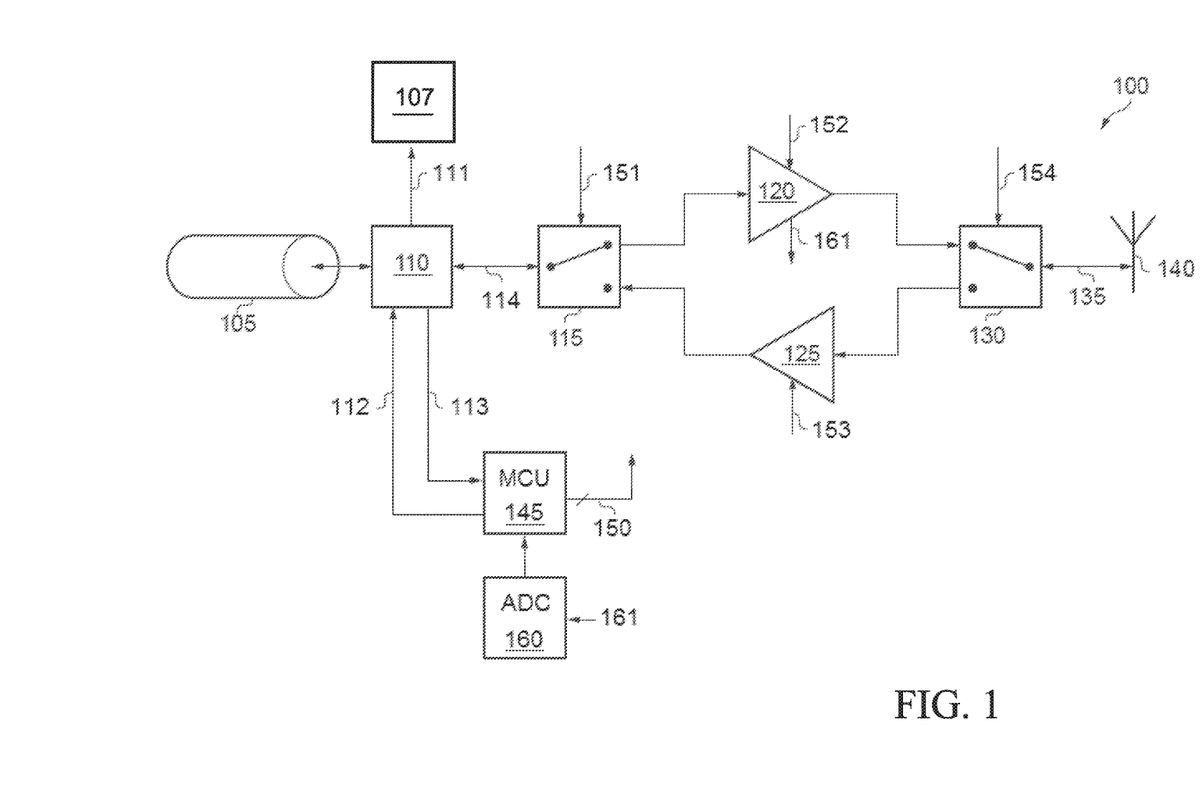
FIG. 1 illustrates a block diagram depicting example components of a wireless communication unit, which may be operated in a functional mode of operation, according to some embodiments of the present disclosure.

FIG. 1 shows example components of a wireless communication unit 100 (also referred to as a unit 100). Unit 100 may be operated in a functional mode to wirelessly communicate with other communication units, as discussed below. In some embodiments, unit 100 is part of a wireless communication system implemented in a vehicle that may be used to communicate wirelessly with other communication units in the vicinity of the vehicle. Such other communication units may be implemented in other vehicles (which may be referred to as vehicle-to-vehicle communication, or V2V) or may be implemented as roadside units and the like (which may be referred to as vehicle-to-everything communication, or V2X). Unit 100 may be operated at radio frequency, such as around 6 GHz, although other frequencies may be used (e.g., around 760 MHz).

Unit 100 may be considered a remote unit 100 that is communicatively coupled to a main or base communication unit (405, shown in FIG. 4) by a cable 105, such as a coaxial cable, which is configured to convey signals in a bidirectional manner between unit 100 and the base unit 405. Unit 100 is configured to receive signals from and transmit signals to the base unit 405 via the cable 105. Unit 100 includes a signal separator 110 at the interface of the cable 105, where signal separator 110 is configured to separate signals received from the base unit 405 via cable 105, such as a power signal 111, a control signal 113, and a radio frequency (RF) signal 114 for transmission. Unit 100 also includes a power supply circuit 107 configured to receive the power signal 111 to power the unit 100, a microcontroller unit (MCU) 145 configured to process the control signal 113, and a transceiver (or transmitter and receiver) that is configured to transmit or receive a RF signal 114. Signal separator 110 is also configured to combine signals to send to the base unit 405 via cable 105, such as an RF signal 114 received by the transceiver and a control signal 112. In other embodiments, unit 100 may include a local power source connected to power supply circuit 107 to power the unit 100, where base unit 405 may not need to send a power signal 111 to unit 100.

The transceiver of unit 100 includes a first switch 115, a transmit (Tx) path (shown as the top path) that implements Tx path circuitry 120, a receive (Rx) path (shown as the bottom path) that implements Rx path circuitry 125, a second switch 130, a transmission line 135, and an antenna 140. The first switch 115 has a first node (or Tx node) coupled to an input of the Tx path circuitry 120 (shown as the top node), a second node (or Rx node) coupled to an output of the Rx path circuitry 125 (shown as the bottom node), and a third node coupled to a bidirectional node of the signal separator 110. The second switch 130 has a first (Tx) node coupled to an output of the Tx path circuitry 120 (shown as the top node), a second (Rx) node coupled to an input of the Rx path circuitry 125 (shown as the bottom node), and a third node coupled to a bidirectional node of the transmission line 135, which in turn is coupled to antenna 140. Switches 115 and 130 are RF switches that each implement isolation or attenuation (e.g., −40 dB) between the Tx and Rx nodes to maintain signal integrity.

In the embodiment shown, Tx path circuitry 120 includes a radio frequency (RF) amplifier, such as a power amplifier configured to amplify an RF signal by some configurable gain (e.g., +30 dB) and drive the antenna 140 with the amplified RF signal. The signal power of an RF signal transmitted on the antenna 140 is generally much greater than the signal power of an RF signal received on the antenna 140. In the embodiment shown, Rx path circuitry 125 also includes an RF amplifier, such as a low noise amplifier configured to amplify a very low power RF signal received on the antenna 140 by some configurable gain (e.g., +15 dB) without significantly degrading its signal-to-noise ratio (SNR). For ease of explanation, Tx path circuitry 120 is referred to herein as power amplifier (PA) 120, and Rx path circuitry 125 is referred to herein as low noise amplifier (LNA) 125, although Tx path circuitry 120 and Rx path circuitry 125 may include additional components in other embodiments, such as impedance matching components (not shown).

MCU 145 includes controller logic configured to operate the transceiver in a functional mode of operation, in response to one or more control signals 113 provided from the base unit 405. MCU 145 outputs a number of control signals 150 to components of the transceiver to control the transceiver to either transmit or receive an RF signal during the functional mode of operation. The controller logic on MCU 145 may also communicate with controller logic on the base unit 405 in a bidirectional manner, such as by providing one or more control signals 112 to the base unit 405 via signal separator 110 and cable 105. An RF signal received on antenna 140 may also be conveyed to the base unit 405 via signal separator 110 and cable 105. In some embodiments, MCU 145 includes circuitry that implements the controller logic.

For example, FIG. 1 shows transmission of an RF signal 114 (which is provided by the base unit 405 via cable 105) on antenna 140, where MCU 145 respectively outputs control signals 151 and 154 to switches 115 and 130, which controls each switch to select the first (Tx) node that is coupled to PA 120. MCU 145 also outputs control signal 152 to activate PA 120, such as by providing a power signal or a bias signal to PA 120 (or by controlling power supply circuit 107 to provide such a signal to PA 120). MCU 145 also outputs control signal 153 to LNA 125 to remain inactive while antenna 140 transmits a signal. The RF signal 114 received on cable 105 is separated out by signal separator 110 and provided to the third (or input) node of switch 115, which is coupled to PA 120. The RF signal 114 is amplified by PA 120 and provided to antenna 140 via switch 130 and transmission line 135.

To receive an RF signal on antenna 140, MCU 145 respectively outputs control signals 151 and 154 to switches 115 and 130, which controls each switch to select the second (Rx) node that is coupled to LNA 125. MCU 145 also outputs control signal 153 to activate LNA 125, such as providing a power signal or a bias signal to LNA 125 (or by controlling power supply circuit 107 to provide such a signal to LNA 125). MCU 145 also outputs control signal 152 to PA 120 to remain inactive while antenna 140 receives a signal. A low power RF signal received on antenna 140 is provided to the third (or input) node of switch 130 via transmission line 135. The input node of switch 130 is coupled to LNA 125, which amplifies the low power RF signal to a stronger RF signal 114. The RF signal 114 is provided to the signal separator 110 via switch 115, which conveys the RF signal 114 to the base unit 405 via cable 105.

Since the base unit 405 and unit 100 are connected by a cable 105 that experiences an amount of loss (e.g., −10 dB) dependent on the length of the cable 105 and temperature, RF signals are compensated for this cable loss or attenuation in the embodiments discussed herein. For example, PA 120 and LNA 125 may be configured to amplify RF signals according to a configurable gain setting provided by the base unit 405 to compensate such cable loss at the unit 100. Also, in order to maintain a nominal output power at the antenna 140 (e.g., accuracy maintained to within ±2 dB over a −40 C to 105 C temperature range), a closed control loop approach may be used in some embodiments to provide feedback to the base unit 405 for compensating cable loss. For example, signal power of an RF signal conveyed by cable 105 is measured at the receiving interface of cable 105, where the measurement is provided to base unit 405 for adjusting the signal power of subsequent RF signals generated at the base unit 405. While such a compensation and closed control loop scheme is beneficial for operation of a remote transceiver unit like unit 100, such a compensation and closed control loop scheme is not necessary for implementation of the present disclosure. In fact, the present disclosure may be implemented in either a local or a remote transceiver unit that does not implement such a compensation and closed control loop scheme or may implement some other type of scheme, since the present disclosure relies on the isolation present in a switch that couples a transmit path and a receive path to an antenna.

In some embodiments, unit 100 may also include an analog-to-digital converter (ADC) 160, which may be implemented as part of the MCU 145. In the embodiment shown, the PA 120 has an output power measurement signal 161 that indicates a present output power implemented by PA 120. As noted above, the base unit 405 is configured to provide RF signals at a nominal signal power to unit 100 via cable 105, and PA 120 is configured to implement a nominal output power during the functional mode of operation when transmitting RF signals. Controller logic of the MCU 145 may trigger a check of the measurement signal 161 in response to a control signal 113 received from the base unit 405. For example, an RF signal is provided by base unit 405 at the input of PA 120. As PA 120 amplifies the RF signal, measurement signal 161 is provided to ADC 160, which digitizes the signal 161 and provides it to controller logic of the MCU 145. Controller logic of the MCU 145 may then report the measurement signal 161 to the base unit 405 to indicate proper or improper output power of the PA 120. However, LNA 125 does not have a comparable manner in which to confirm proper output power, since base unit 405 is not configured to directly provide a signal at the LNA 125 input. Further, in order to achieve such a configuration, a local signal generator at the operational frequency (e.g., 6 GHz) and additional circuitry would be required to provide such a signal at the LNA 125 input on unit 100, which adds unnecessary complexity and expense to unit 100, especially if multiple units 100 are implemented in a wireless communication system. Rather, a test mode of operation is implemented to perform a check on operation of LNA 125, as further discussed below in connection with FIGS. 2 and 3.

Figure 2:
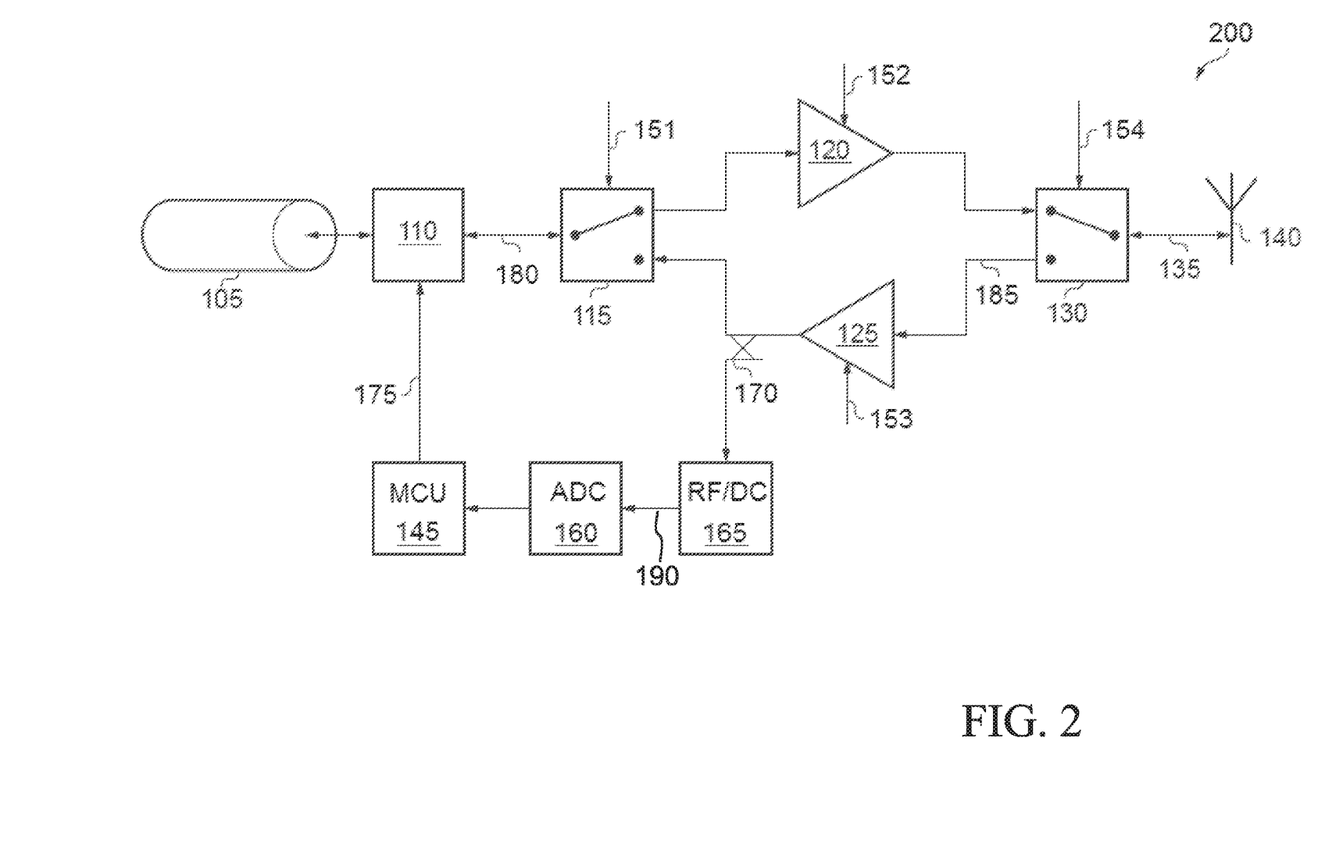
FIGS. 2 and 3 illustrate block diagrams depicting example arrangements of the components of the wireless communication unit, which may be operated in a test mode of operation, according to some embodiments of the present disclosure.

FIG. 2 shows an example arrangement 200 of components of the wireless communication unit 100 that may be operated in an example test mode. Unit 100 further includes a radio frequency to direct current (RF to DC) converter 165, which is coupled to the output of the LNA 125 by an RF coupler 170, such as a directional coupler. The output of RF to DC converter 165 is provided to an ADC 160, which may be another ADC implemented in unit 100, which may be implemented as part of MCU 145.

The controller logic implemented on MCU 145 is further configured to operate the transceiver in a test mode of operation, in response to one or more control signals 113 (as shown in FIG. 1) provided from the base unit 405. For example, to implement the test mode, MCU 145 respectively outputs control signals 151 and 154 to switches 115 and 130, which controls each switch to select the first (Tx) node that is coupled to PA 120. MCU 145 also outputs control signal 152 to activate PA 120. MCU 145 also outputs control signal 153 to activate LNA 125 concurrently while PA 120 is activated. In other words, although the Tx path is selected, both the PA 120 and LNA 125 are activated.

Base unit 405 provides an RF test signal 180 via cable 105, which is separated out and provided by signal separator 110 to the third (input) node of switch 115. In order to avoid disturbing other communication units (e.g., in the vicinity of the vehicle), the RF test signal 180 is a low power signal, which has a signal power less than the nominal signal power (e.g., in a range of 15 dBm to −5 dBm) implemented by the base unit 405 during the functional mode of operation. For example, the signal power of the RF test signal 180 may be −20 dBm at the base unit 405. It is noted that while specific gain and loss values are used herein, such values are merely example values used to illustrate the concept of the test mode, and that other values may be implemented in other embodiments. It is also noted that the same operational frequency (e.g., radio frequency) used to generate RF signals at the base unit 405 during the functional mode may also be used to generate the RF test signal 180 at the base unit 405 during the test mode, which avoids having to change settings on the base unit 405 to implement the test mode. The RF test signal 180 is conveyed across cable 105, which attenuates the signal (e.g., −10 dB), resulting in an attenuated RF test signal 180 (e.g., signal power of −30 dBm) received at signal separator 110 and provided to switch 115. Since the Tx node is selected at switch 115, switch 115 provides the RF test signal 180 to an input of PA 120, which amplifies the signal (e.g., +30 dB) and outputs an amplified RF test signal 180 (e.g., signal power of 0 dBm). Also, since the Tx node is selected at switch 130, switch 130 provides the RF test signal 180 to antenna 140 via transmission line 135.

As the RF test signal 180 is being transmitted, the RF test signal 180 (e.g., signal power of 0 dBm at switch 130) couples across switch 130 to the unselected Rx node of switch 130. Since switch 130 implements isolation (e.g., −40 dB) between the Tx and Rx nodes, the coupling generates a leakage signal 185 on the Rx node, which is an attenuated version of the RF test signal 108 (e.g., signal power of −40 dBm). Since LNA 125 is activated, LNA 125 amplifies the leakage signal 185 (e.g., +15 dB) and outputs an amplified leakage signal 185 (e.g., signal power of −25 dBm). If the LNA 125 is not operating properly (e.g., implements improper output power) or is not functional, the signal power at the output of LNA 125 is much lower (e.g., lower than −25 dBm) than the signal power provided from an operational LNA. Further, defects or errors in circuitry such as impedance matching components in the Rx path (and in the Tx path) may also be detected since such errors often cause additional attenuation of the leakage signal 185 that further lowers the signal power at the output of LNA 125.

The output of LNA 125 is coupled to RF/DC converter 165 via RF coupler 170. RF/DC converter 165 is configured to output an analog low frequency signal 190, also referred to as a DC voltage signal 190, having a value that corresponds to the signal power at the output of LNA 125. The DC voltage signal 190 of RF/DC converter 165 is provided to an ADC 165, which is configured to digitize the DC voltage signal, which in turn is provided to the MCU 145. In some embodiments, the controller logic implemented on the MCU 145 provides the digitized DC voltage signal (e.g., a digital code word) as a control signal 175 to the base unit 405 via signal separator 110 and cable 105. In such embodiments, the base unit 405 may analyze the digitized DC voltage signal and determine whether an error has been detected in operation of the LNA 125. For example, if the LNA 125 has suffered a fault (e.g., a gain setting of LNA 125 has been changed due to a transient fault or the LNA 125 is not functional), the signal power of the leakage signal at the output of LNA 125 falls below an expected signal power for a properly operating LNA, within some tolerance that takes into account expected variation in the signal power at the output of LNA 125. The expected signal power corresponds to an expected DC voltage value, which can be set as a threshold value for a properly operating LNA. An error is detected if the digitized DC voltage signal 175 falls below the threshold value.

In other embodiments, the controller logic implemented on the MCU 145 provides an indication of whether an error has been detected in operation of the LNA 125 as a control signal 175 to the base unit 405 via signal separator 110 and cable 105. For example, the controller logic on MCU 145 determines whether the digitized DC voltage signal 175 falls below the threshold value and simply reports a ready status or a fault status to the base unit 405 via cable 105.

Figure 3:
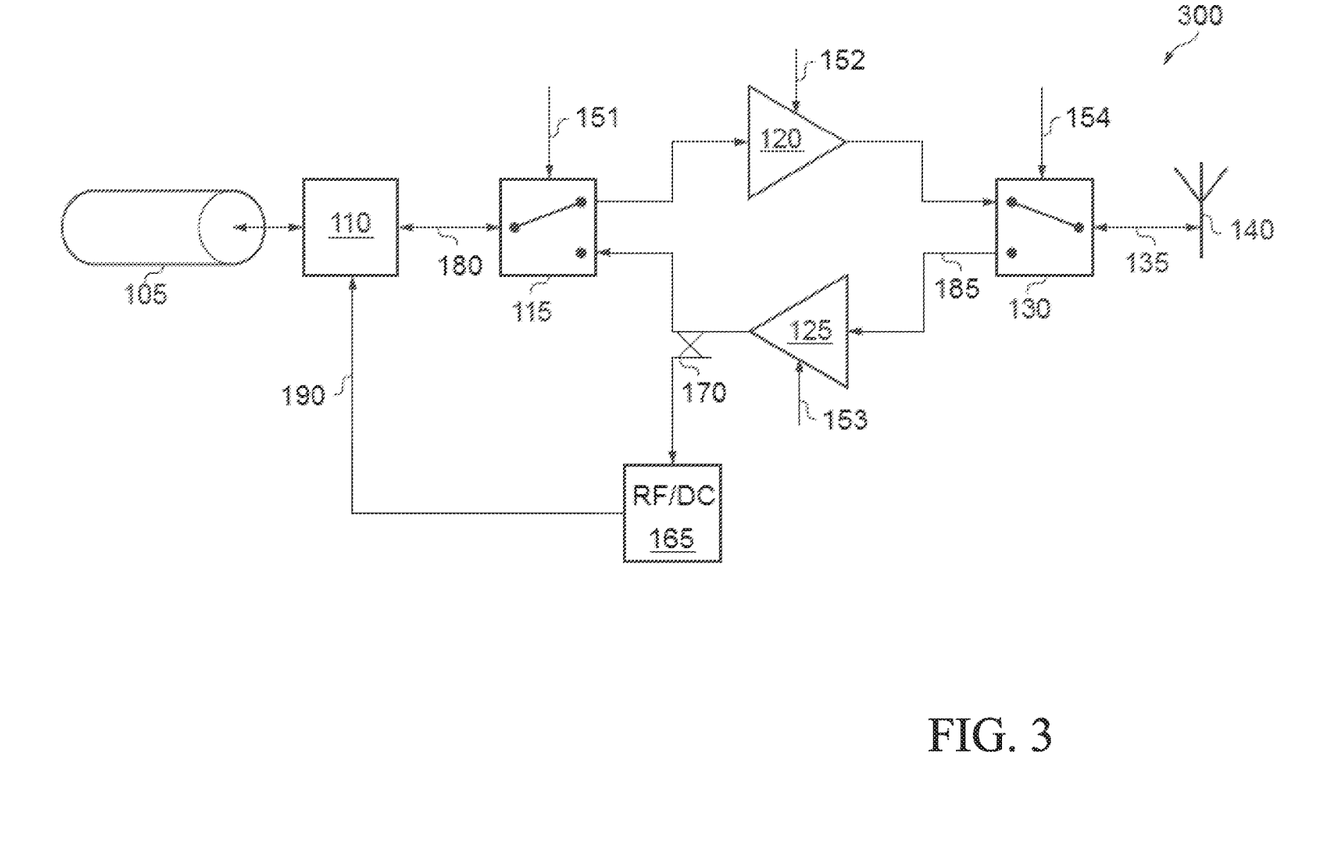

In other embodiments, the DC voltage signal 190 itself may be provided to base unit 405 via signal separator 110 and cable 105, as shown in FIG. 3, which provides an alternative arrangement 300 of the components of unit 100. In such embodiments, an ADC 160 is not required and the MCU 145 need not receive the DC voltage signal 190. Depending on the construction of the signal separator 110, the DC voltage signal 190 from RF/DC converter 165 may be transmitted directly over cable 105 or may be modulated by signal separator 110 or other circuitry to a level acceptable for transmission over cable 105 that can be recognized by the base unit 405.

It is noted that the RF/DC converter 165 may be implemented as an integrated circuit in some embodiments. In some embodiments, RF/DC converter 165 may be implemented as one or more diodes and one or more capacitors in a rectifier configuration for converting or rectifying the RF leakage signal at the output of the LNA 125 into DC voltage signal 190.

It is also noted that the RF test signal 180 (e.g., signal power of −30 dBm at switch 115) may also couple across switch 115 to the unselected Rx node of switch 115, as LNA 125 amplifies leakage signal 185. Since switch 115 also implements isolation (e.g., −40 dB) between the Tx and Rx nodes, the coupling generates an interference signal (e.g., signal power of −70 dBm) on the Rx node, which is also coupled to the RF coupler 170. The signal power of the amplified leakage signal at the output of LNA 125 (e.g., −25 dBm) should be much larger than the signal power of the interference signal (e.g., −70 dBm) due to the gain of the PA 120 and LNA 125, where the difference should be large enough to distinguish the amplified leakage signal as the signal of interest for measurement by RF/DC converter 165 and should not affect error detection for a properly operating LNA.

Although the presently disclosed test mode is discussed herein with respect to the components of the wireless communication unit 100 shown in FIGS. 1, 2, and 3, the teachings of the present disclosure are applicable to any transceiver device that includes a transmit (Tx) path and a receive (Rx) path coupled to an antenna by a switch or similar coupling device (e.g., a circulator) implementing some isolation between the Tx and Rx paths, where an output of an LNA on the Rx path receiving a leakage signal is measured while a test signal is concurrently conveyed on the Tx path through the switch in order to determine whether output power of the LNA is in a proper operational range.

Figure 4:
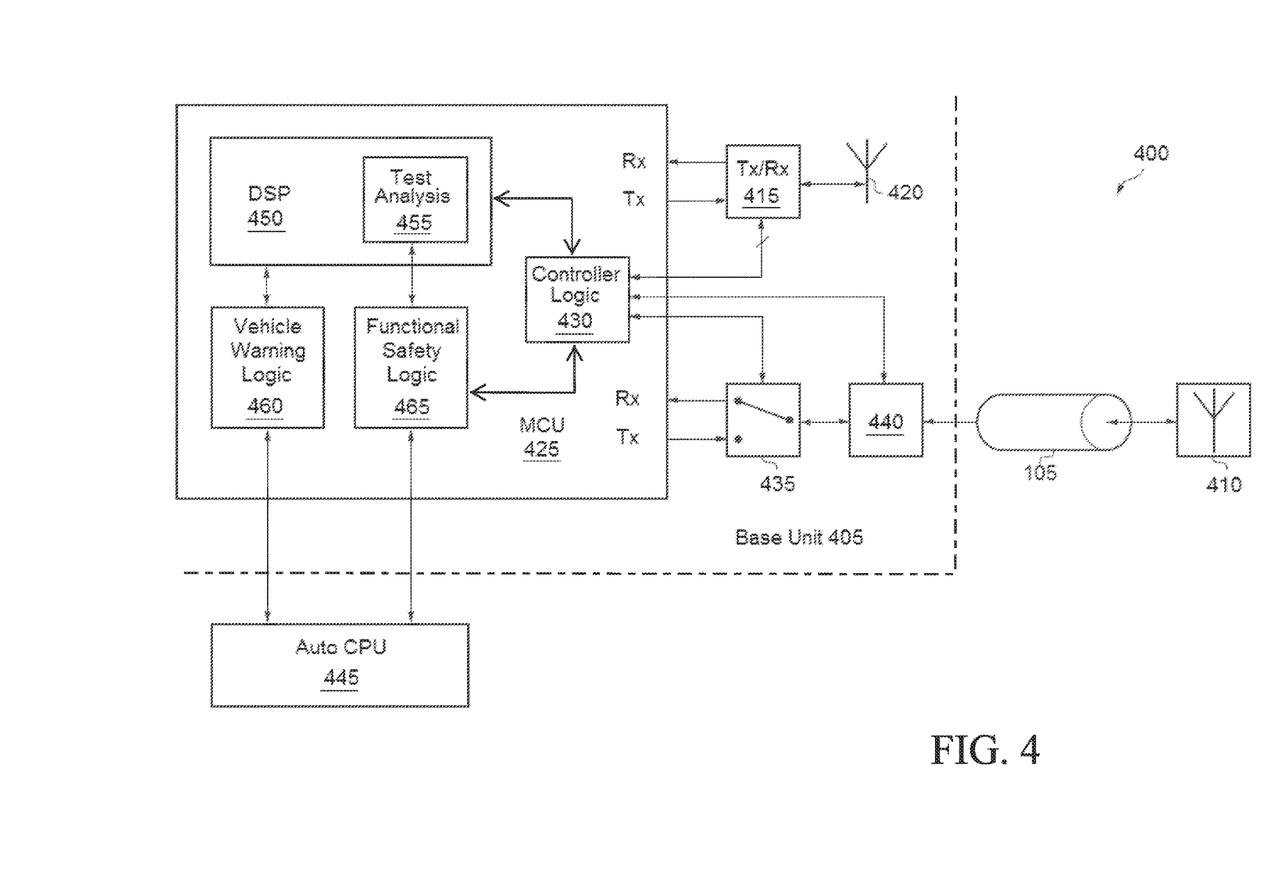
FIG. 4 illustrates a block diagram depicting an example wireless communication system in which the wireless communication unit is implemented, according to some embodiments of the present disclosure.

FIG. 4 shows an example wireless communication system 400 which includes a base communication unit 405, a wireless communication unit 410, and a cable 105, such as a coaxial cable discussed above. Wireless communication unit 410 (also referred to as remote unit 410) includes components similar to those components included in unit 100 (shown in FIG. 1), which are configured to operate in a functional mode (discussed in connection with FIG. 1) and a test mode (discussed in connection with either FIG. 2 or 3), as indicated by the base communication unit 405.

Base communication unit 405 (also referred to as base unit 405) may include several components similar to the components included in unit 100. For example, base unit 405 includes a transceiver (Tx/Rx) 415, which may include components similar to those shown in FIG. 1, such as Tx path circuitry 120, Rx path circuitry 125, switch 130, and a transmission line 135, which is coupled to an antenna 420. In the embodiment shown, a dedicated transmit (Tx) line and a dedicated receive (Rx) line are coupled to transceiver 415. In other embodiments, a single line for both a transmit signal and a received signal may be provided to transceiver 415, which may also include a similar switch 115 to provide bidirectional communication for transceiver 415.

Base unit 405 also includes a microcontroller (MCU) 425, which in turn implements controller logic 430. Controller logic 430 outputs a number of control signals to components of the transceiver 415, where controller logic 430 is configured to operate transceiver 415 to either transmit or receive an RF signal during the functional mode of operation, similar to that discussed above. In some embodiments, controller logic 430 may be further configured to operate the transceiver 415 in the test mode, similar to that discussed above. Although not shown, base unit 405 also includes circuitry configured to generate RF signals, such as a local oscillator, a phase locked loop (PLL), a mixer (e.g., for upmixing a low frequency signal into an RF signal), and the like. In some embodiments, MCU 425 includes circuitry that implements controller logic 430, DSP 450, test analysis logic 455, functional safety logic 465, and vehicle warning logic 460, which are further discussed below.

Controller logic 430 is further configured to operate remote unit 410 in either the functional mode or the test mode, as discussed above. Controller logic 430 outputs a control signal to switch 435, which includes a first (Rx) node coupled to a receive signal port or node of the MCU 425 (shown as the top node), a second (Tx) node coupled to a transmit signal port or node of the MCU 425 (shown as the bottom node), and a third node coupled to a signal separator 440, which in turn is coupled to cable 105. Controller logic 430 outputs control signals to the remote unit 410 and receives control signals from the remote unit 410 through a bidirectional control signal path to signal separator 440, which may be implemented as two control signal lines (e.g., similar to lines 112 and 113 shown in FIG. 1). Signal separator 440 is configured to combine signals to send to the remote unit 410 via cable 105, such as an RF signal for transmission at the remote unit 410, a control signal from controller logic 430, and a power signal to power the remote unit 410. Signal separator is also configured to separate signals received from the remote unit 410 via cable 105, such as an RF signal received at the remote unit 410 and a control signal received from controller logic implemented on the remote unit 410 (e.g., on MCU 145 shown in FIG. 1).

MCU 425 also includes digital signal processing (DSP) 450 configured to process RF signals, such as to encode information in an RF signal for transmission to another wireless communication unit (e.g., a base unit 405 or a remote unit 410, which may be implemented on another vehicle or as a roadside unit), or to determine information conveyed in an RF signal received from another wireless communication unit. Information determined from other wireless communication units may be provided to vehicle warning logic 460, which is communicatively coupled to an automotive central processing unit (auto CPU) 445, which may be implemented with one or more processing units. Vehicle warning logic 460 may provide warning indicators to auto CPU 445 about present road conditions, traffic conditions, and the like. Auto CPU 445 may in turn provide such information to other systems of the vehicle, such as driver assistance systems, for improved performance (e.g., providing an indication to a brake assist system that it is raining ahead). In some embodiments, DSP 450 is communicatively coupled to controller logic 430 to coordinate the transmit and receive RF signals that are provided to and received from remote unit 410 via cable 105.

In some embodiments, DSP 450 may also implement test analysis logic 455, which is configured to receive the error (control) signal from remote unit 410 during a test mode and determine whether an error has been detected in the receive path circuitry of the remote unit 410. In some embodiments, test analysis logic 455 is configured to receive a digitized DC voltage signal (e.g., digital code word) as the error signal and compare it with an expected or threshold DC voltage value to determine whether an error has been detected (e.g., an error is detected if the received DC voltage signal is less than the threshold DC voltage value). In other embodiments, test analysis logic 455 is configured to receive an error indication (e.g., digital code word) as the error signal from remote unit 410, which may indicate that the remote unit 410 is in either a ready status (e.g., proper operation) or a fault status (e.g., improper operation). In still other embodiments, test analysis logic 455 implements circuitry to compare a DC voltage signal (which may be modulated) with an expected or threshold DC voltage value to determine whether an error has been detected (e.g., an error is detected if the received DC voltage signal is less than the threshold DC voltage value).

Test analysis logic 455 is communicatively coupled to functional safety logic 465, which is configured to initiate the test mode of operation, such as on startup of the wireless communication system 400 (e.g., when the vehicle starts up) or after a period of time has elapsed in which no communication has been received from a remote unit 410. In some embodiments, functional safety logic 465 is also communicatively coupled to controller logic 430 to initiate the test mode by sending control signals to the remote unit 410 and to coordinate the RF test signal and error signal that are provided to and received from remote unit 410 via cable 105. Test analysis logic 455 may provide an error indication to functional safety logic 465, depending on whether an error is detected. In some embodiments, the DC value of the error signal may be provided to functional safety logic 465, which may store and track the error values and determine whether a downward trend is occurring (e.g., LNA performance is deteriorating) even if the error value indicates an error is not yet detected. In response, functional safety logic 465 may issue a warning to the driver for maintenance of the communication unit that includes the faulty LNA before the LNA fails and causes safety concerns.

Functional safety logic 465 is also communicatively coupled to auto CPU 445 and is configured to provide further warning indications to auto CPU 445, such as provide a present test status of the remote unit 410 based on the error signal or indication from remote unit 410. Functional safety logic 465 may also be configured to perform a course of action in response to the error indication received from test analysis logic 455. For example, functional safety logic 465 may determine from the error indication that a wireless communication unit (such as base unit 405 or remote unit 410) needs to be restarted, and in response triggers a restart of the wireless communication unit or may even restart the wireless communication system. Functional safety logic 465 may also communicate a not-ready status to the auto CPU until the unit or system is operational. Functional safety logic 465 may also determine that the error indication indicates an irreparable failure of the unit (e.g., even after restart), and in response triggers the unit to power down. Functional safety logic 465 may also communicate a failure status of the unit to the auto CPU. Functional safety logic 740 may further monitor other values such as temperature, power supply voltages, PLL status, and the like.

Figure 5:
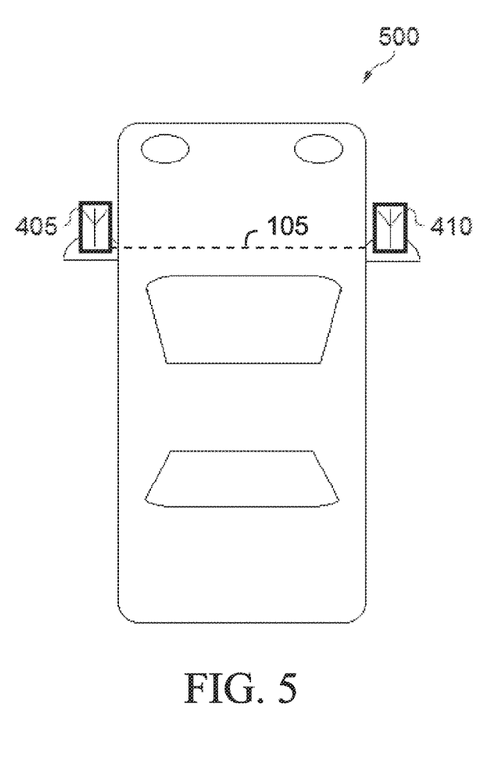
FIGS. 5 and 6 illustrate block diagrams depicting example arrangements of the wireless communication system in a vehicle, according to some embodiments of the present disclosure.

FIG. 5 shows an arrangement 500 of the wireless communication system implemented in a vehicle. Base unit 405 and at least one remote unit 410 are implemented at different locations on the vehicle, such as on the side view mirrors of the vehicle, and are communicatively coupled by cable 105. Although the antennas implemented in the base unit 405 and remote unit 410 are not omnidirectional, locating the base unit 405 and remote unit 410 on opposite sides of the vehicle achieves near-omnidirectional wireless communication around the vehicle and increased coverage area for the wireless communication system. While having a long cable 105 across the vehicle increases the attenuation of signals conveyed on the cable 105, the signals are compensated for such cable loss as noted above.

Figure 6:
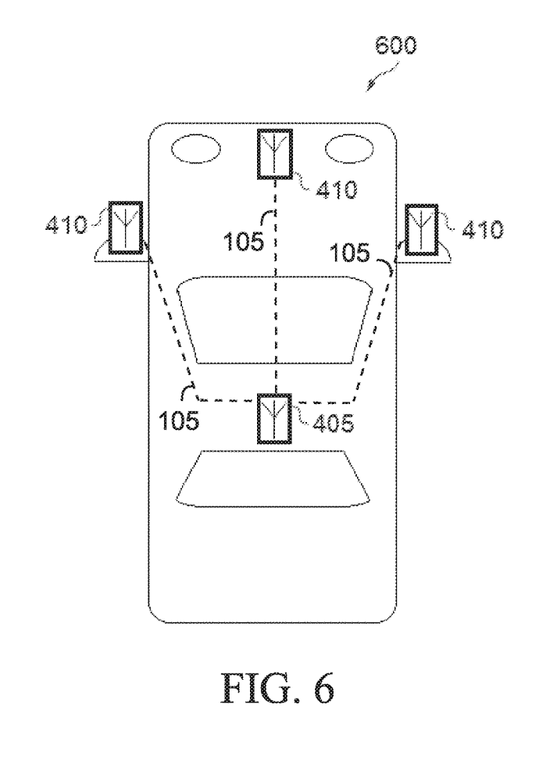

FIG. 6 shows another arrangement 600 of the wireless communication system implemented in a vehicle. Base unit 405 and three remote units 410 are implemented at different locations on the vehicle, such as on the side view mirrors of the vehicle, at the front of the vehicle, and at a rear rooftop location of the vehicle. Each remote unit 410 is communicatively coupled to base unit 405 by a respective cable 105. The additional remote units 410 also achieves near-omnidirectional wireless communication around the vehicle and further increases the coverage area for the wireless communication system.

Figure 7:
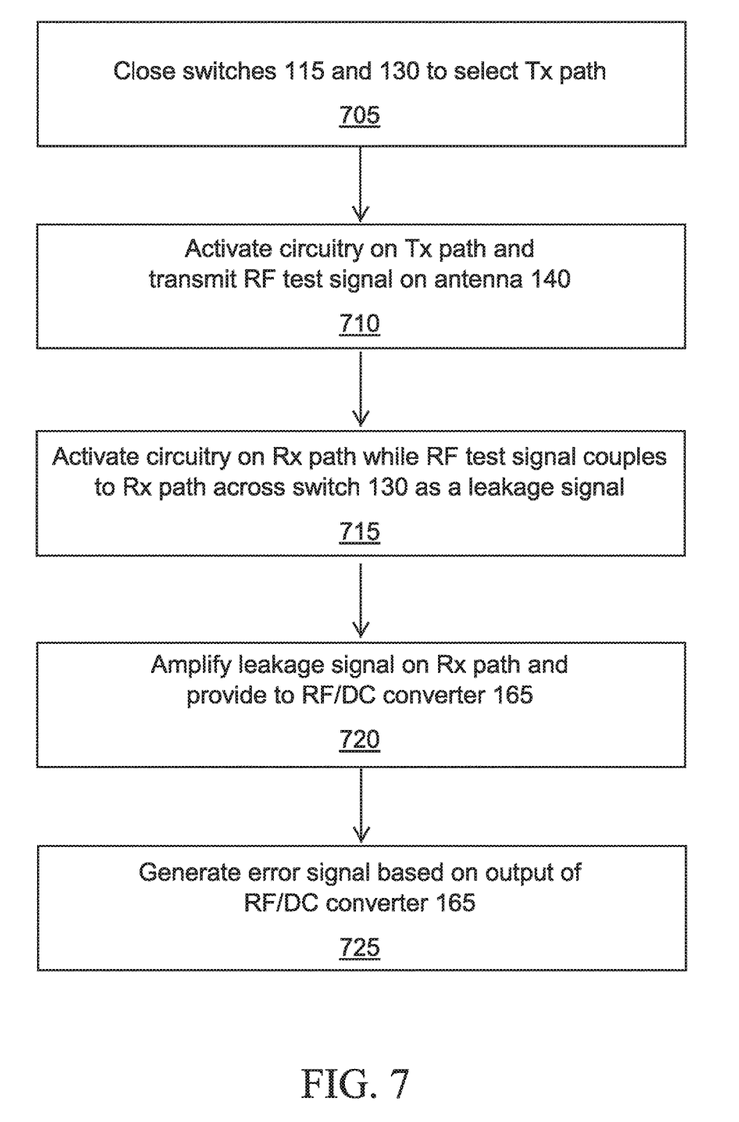
FIG. 7 illustrates a flowchart depicting example steps to implement the test mode of operation in the wireless communication unit, according to some embodiments of the present disclosure.

FIG. 7 shows a flowchart of an example method of operating the wireless communication unit in a test mode of operation. In some embodiments, controller logic on MCU 145 implements the method shown in FIG. 7 in response to control signals received from controller logic 430 on a base unit 405.

The method begins at operation 705, where switches 115 and 130 are controlled to select the Tx path. For example, MCU 145 may output signals 151 and 154 to respectively control switches 115 and 130 to close a connection to Tx nodes of switches 115 and 130. The method continues to operation 710, where circuitry on the Tx path is activated, such as providing a control signal or bias signal to power a power amplifier. An RF test signal is received from base unit 405 via cable 105 and is transmitted on antenna 140 via the Tx path.

The method continues to operation 715, where circuitry on the Rx path is activated, such as providing a control signal or bias signal to power a low noise amplifier. As the RF test signal is being transmitted, the RF test signal couples across switch 130 as a leakage signal. The method continues to operation 720, where the leakage signal is amplified on the Rx path, such as by the low noise amplifier. The output of the Rx path is provided to an RF/DC converter 165. It is noted that operations 710, 715, and 720 occur concurrently (e.g., the leakage signal is amplified and provided to converter 165 as the RF test signal is being transmitted).

The method continues to operation 725, where an error signal is generated based on the output of the RF/DC converter 165. Such an error signal may be a control signal that conveys a digital code, a (binary) indication of a ready or failure status of the Rx path circuitry, or the output signal of the RF/DC converter 165 (which may need to be modulated in order to be transmitted over the cable 105). In some embodiments, the error signal is generated by controller logic on the MCU 145 and provided back to the base unit 405 for further analysis.

In some embodiments, the illustrated elements of wireless communication unit 100 (and similarly base unit 405 and remote unit 410) are circuitry that may be located on a single printed circuit board (PCB) or within a same device. Alternatively, a wireless communication unit may include any number of separate integrated circuits or separate devices interconnected with each other. For example, a transceiver may be implemented as a single integrated circuit including switches 115 and 130, PA 120, and LNA 125, as a single integrated circuit that only includes PA 120 and LNA 125, or as separate integrated circuits for PA 120 and for LNA 125. MCU 145 may also be located on a separate integrated circuit.

Furthermore, those skilled in the art will recognize that boundaries between the functionality of the above described logic (such as in FIG. 4) are merely illustrative. The functionality of multiple logic circuits or modules may be combined into a single circuit or module, the functionality of a single logic circuit or module may be distributed in additional circuits or modules, or both. Moreover, alternative embodiments may include multiple instances of a particular circuit or module.

The integrated circuits discussed herein may be implemented on a semiconductor die or substrate, which can be any semiconductor material or combinations of materials, such as gallium arsenide, silicon germanium, silicon-on-insulator (SOI), silicon, monocrystalline silicon, the like, and combinations of the above. Active circuitry of the plurality of die on semiconductor die or substrate is formed using a sequence of numerous process steps, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like. Examples of integrated circuit components include but are not limited to a processor, memory, logic, analog circuitry, sensor, MEMS (microelectromechanical systems) device, a standalone discrete device such as a resistor, inductor, capacitor, diode, power transistor, and the like. In some embodiments, the active circuitry may be a combination of the integrated circuit components listed above or may be another type of microelectronic device.

In some embodiments, switches may be implemented using one or more transistors, such as n-channel or p-channel transistors, or other suitable switching devices. The switch control signals are each configured to open or close the respective switch (e.g., to close the switch by making it conductive and complete the path between two nodes of the switch, or to open the switch by making the switch nonconductive and break the path between the two nodes of the switch).

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The above description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. For example, a switch may be "coupled to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected).

By now it should be appreciated that there has been provided a diagnostic approach for detecting the functionality of a low noise amplifier (LNA) in a wireless communication device by transmitting a low power radio frequency (RF) test signal and concurrently measuring the signal power of the output of the LNA as it amplifies a leakage signal coupled from the RF test signal. The output of the LNA is converted into a low frequency analog voltage signal that indicates an error is detected if the analog signal falls below an expected threshold value.

In one embodiment of the present disclosure, a wireless communication system is provided, which includes: a first communication unit including: transmit path circuitry, receive path circuitry, an antenna, a switch having a first node coupled to an output of the transmit path circuitry, a second node coupled to an input of the receive path circuitry, and a third node coupled to the antenna, and a radio frequency (RF) to direct current (DC) converter coupled to an output of the receive path circuitry by a directional coupler; and controller logic configured to operate the first communication unit in a test mode of operation, the controller logic configured to: close the switch to connect the first node to the third node, wherein the second node remains unconnected, activate the transmit path circuitry to transmit an RF test signal on the antenna, wherein the RF test signal couples across the switch to the second node as a leakage signal, activate the receive path circuitry concurrently as the RF test signal is transmitted, wherein the receive path circuitry provides the leakage signal to the RF to DC converter via the directional coupler, and wherein the RF to DC converter is configured to generate an error signal that indicates whether an error has been detected in the receive path circuitry.

One aspect of the above embodiment provides that the error signal includes a DC voltage signal that corresponds to signal power of the leakage signal, and an error is detected when the DC voltage signal falls below a threshold value.

Another aspect of the above embodiment provides that the receive path circuitry includes a low noise amplifier (LNA) configured to amplify the leakage signal, and the error signal indicates the LNA has suffered a fault when signal power of the leakage signal at an output of the LNA falls below a threshold value.

Another aspect of the above embodiment provides that the RF to DC converter includes one or more diodes and one or more capacitors in a rectifier configuration.

Another aspect of the above embodiment provides that an output of the RF to DC converter is connected to an analog-to-digital converter (ADC) that is configured to provide a digitized version of the error signal to the controller logic.

Another aspect of the above embodiment provides that signal power of the RF test signal at an output of the transmit path circuitry during the test mode of operation is less than nominal signal power of RF signals at the output the transmit path circuitry during a functional mode of operation.

Another aspect of the above embodiment provides that the wireless communication system further includes: a base communication unit connected to the first communication unit by a cable, wherein the first communication unit further includes a signal separator at an interface of the cable, wherein the signal separator is configured to separate control signals, RF signals, and a power signal received from the base communication unit via the cable.

A further aspect of the above embodiment provides that the RF test signal is provided by the base communication unit to the first communication unit via the cable, wherein signal power of the RF test signal provided by the base communication unit during the test mode of operation is less than nominal signal power of RF signals provided by the base communication unit during a functional mode of operation.

Another further aspect of the above embodiment provides that the error signal is provided to the base communication unit via the cable.

Another further aspect of the above embodiment provides that a digitized version of the error signal is provided to the base communication unit via the cable.

Another further aspect of the above embodiment provides that an error indication based on the error signal is provided to the base communication unit via the cable.

Another further aspect of the above embodiment provides that the base communication unit further includes test analysis logic and functional safety logic, wherein the test analysis logic is configured to analyze a test result signal received from the first communication unit via the cable, and provide an error indication to the functional safety logic.

A still further aspect of the above embodiment provides that the functional safety logic is configured to communicate an action to an automotive processing unit in response to the error indication, wherein the action is at least one of a group of actions including: restart the first communication unit, power down the first communication unit, communicate a not-ready status to the automotive processing unit, and communicate a failure status of the first communication unit to the automotive processing unit.

Another further aspect of the above embodiment provides that the first communication unit is one of a plurality of communication units remotely located around a vehicle and communicatively coupled to the base communication unit via a respective cable.

In another embodiment of the present disclosure, a method for operating a wireless communication unit in a test mode is provided, the wireless communication unit including a transmit path and a receive path coupled to an antenna by a switch, the method including: closing the switch to connect the transmit path to the antenna; transmitting a radio frequency (RF) test signal on the antenna, wherein the RF test signal couples across the switch to the receive path as a leakage signal; activating the receive path to receive the leakage signal concurrently while transmitting the RF test signal on the antenna; and generating an error signal based on the leakage signal, wherein the error signal indicates whether an error has been detected in the receive path.

One aspect of the above embodiment provides that the error signal includes a DC voltage signal that corresponds to signal power of the leakage signal, and an error is detected when the DC voltage signal falls below a threshold value.

Another aspect of the above embodiment provides that the receive path includes a low noise amplifier (LNA) configured to amplify the leakage signal, and the error signal indicates the LNA has suffered a fault when signal power of the leakage signal at an output of the LNA falls below a threshold value.

Another aspect of the above embodiment provides that the error signal includes a digitized version of a DC voltage signal that corresponds to signal power of the leakage signal.

Another aspect of the above embodiment provides that the method further includes: providing the error signal to a base communication unit, wherein the base communication unit is communicatively coupled to the wireless communication unit by a cable.

A further aspect of the above embodiment provides that the method further includes: receiving the RF test signal from the base communication unit, wherein signal power of the RF test signal provided by the base communication unit during the test mode is less than nominal signal power of RF signals provided by the base communication unit during a functional mode.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. For example, additional or fewer wireless control units may be implemented in FIG. 4. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A wireless communication system comprising:
   a first communication unit comprising:
      transmit path circuitry,
      receive path circuitry,
      an antenna,
      a switch having a first node coupled to an output of the transmit path circuitry, a second node coupled to an input of the receive path circuitry, and a third node coupled to the antenna, and
      a radio frequency (RF) to direct current (DC) converter coupled to an output of the receive path circuitry by a directional coupler; and
   controller logic configured to operate the first communication unit in a test mode of operation, the controller logic configured to:
      close the switch to connect the first node to the third node, wherein the second node remains unconnected,
      activate the transmit path circuitry to transmit an RF test signal on the antenna, wherein the RF test signal couples across the switch to the second node as a leakage signal,
      activate the receive path circuitry concurrently as the RF test signal is transmitted, wherein the receive path circuitry provides the leakage signal to the RF to DC converter via the directional coupler, and wherein the RF to DC converter is configured to generate an error signal that indicates whether an error has been detected in the receive path circuitry.

2. The wireless communication system of claim 1, wherein the error signal comprises a DC voltage signal that corresponds to signal power of the leakage signal, and an error is detected when the DC voltage signal falls below a threshold value.

3. The wireless communication system of claim 1, wherein the receive path circuitry comprises a low noise amplifier (LNA) configured to amplify the leakage signal, and the error signal indicates the LNA has suffered a fault when signal power of the leakage signal at an output of the LNA falls below a threshold value.

4. The wireless communication system of claim 1, wherein the RF to DC converter comprises one or more diodes and one or more capacitors in a rectifier configuration.

5. The wireless communication system of claim 1, wherein an output of the RF to DC converter is connected to an analog-to-digital converter (ADC) that is configured to provide a digitized version of the error signal to the controller logic.

6. The wireless communication system of claim 1, wherein signal power of the RF test signal at an output of the transmit path circuitry during the test mode of operation is less than nominal signal power of RF signals at the output of the transmit path circuitry during a functional mode of operation.

7. The wireless communication system of claim 1, further comprising:
   a base communication unit connected to the first communication unit by a cable, wherein
      the first communication unit further comprises a signal separator at an interface of the cable, wherein the signal separator is configured to separate control signals, RF signals, and a power signal received from the base communication unit via the cable.

8. The wireless communication system of claim 7, wherein the RF test signal is provided by the base communication unit to the first communication unit via the cable, wherein signal power of the RF test signal provided by the base communication unit during the test mode of operation is less than nominal signal power of RF signals provided by the base communication unit during a functional mode of operation.

9. The wireless communication system of claim 7, wherein the error signal is provided to the base communication unit via the cable.

10. The wireless communication system of claim 7, wherein a digitized version of the error signal is provided to the base communication unit via the cable.

11. The wireless communication system of claim 7, wherein an error indication based on the error signal is provided to the base communication unit via the cable.

12. The wireless communication system of claim 7, wherein the base communication unit further comprises test analysis logic and functional safety logic, wherein
   the test analysis logic is configured to analyze a test result signal received from the first communication unit via the cable, and provide an error indication to the functional safety logic.

13. The wireless communication system of claim 12, wherein the functional safety logic is configured to communicate an action to an automotive processing unit in response to the error indication, wherein the action is at least one of a group of actions including: restart the first communication unit, power down the first communication unit, communicate a not-ready status to the automotive processing unit, and communicate a failure status of the first communication unit to the automotive processing unit.

14. The wireless communication system of claim 7, wherein the first communication unit is one of a plurality of communication units remotely located around a vehicle and communicatively coupled to the base communication unit via a respective cable.

15. A method for operating a wireless communication unit in a test mode, the wireless communication unit comprising a transmit path and a receive path coupled to an antenna by a switch, the method comprising:
   closing the switch to connect the transmit path to the antenna;
   transmitting a radio frequency (RF) test signal on the antenna, wherein the RF test signal couples across the switch to the receive path as a leakage signal;
   activating the receive path to receive the leakage signal concurrently while transmitting the RF test signal on the antenna; and
   generating an error signal based on the leakage signal, wherein the error signal indicates whether an error has been detected in the receive path.

16. The method of claim 15, wherein the error signal comprises a DC voltage signal that corresponds to signal power of the leakage signal, and an error is detected when the DC voltage signal falls below a threshold value.

17. The method of claim 15, wherein the receive path comprises a low noise amplifier (LNA) configured to amplify the leakage signal, and the error signal indicates the LNA has suffered a fault when signal power of the leakage signal at an output of the LNA falls below a threshold value.

18. The method of claim 15, wherein the error signal comprises a digitized version of a DC voltage signal that corresponds to signal power of the leakage signal.

19. The method of claim 15, further comprising:
providing the error signal to a base communication unit, wherein the base communication unit is communicatively coupled to the wireless communication unit by a cable.

20. The method of claim 19, further comprising:
receiving the RF test signal from the base communication unit, wherein signal power of the RF test signal provided by the base communication unit during the test mode is less than nominal signal power of RF signals provided by the base communication unit during a functional mode.

* * * * *